(12) United States Patent
Faynberg et al.

(10) Patent No.: US 8,776,204 B2
(45) Date of Patent: Jul. 8, 2014

(54) SECURE DYNAMIC AUTHORITY DELEGATION

(75) Inventors: Igor Faynberg, East Brunswick, NJ (US); Hui-Lan Lu, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 326 days.

(21) Appl. No.: 12/723,049

(22) Filed: Mar. 12, 2010

(65) Prior Publication Data

US 2011/0225643 A1  Sep. 15, 2011

(51) Int. Cl.
  *H04L 29/06* (2006.01)
(52) U.S. Cl.
  USPC .............. 726/10; 726/1; 726/2; 726/3; 726/4; 726/5; 726/8; 726/21; 726/26; 726/27; 726/30; 713/156; 713/159; 713/168; 713/170; 713/172; 713/182; 713/185; 709/217; 709/219; 709/225; 709/226; 709/229
(58) Field of Classification Search
  CPC ..... H04L 9/321; H04L 9/3213; H04L 9/3247; H04L 9/3249; H04L 9/3252; H04L 9/3257; H04L 63/08; H04L 63/0807; H04L 63/10; H04L 63/101; H04L 63/102; H04L 63/105; H04L 63/108; G06F 13/362; G06F 13/3625; G06F 13/364; G06F 21/44; G06F 21/45; G06F 21/46; G06F 21/30
  USPC ................ 713/155–159, 164–186; 726/1–10, 726/26–31, 21; 705/50–59; 709/217–229
  See application file for complete search history.

(56) References Cited

U.S. PATENT DOCUMENTS

| 4,868,877 | A  | * | 9/1989  | Fischer ........................ 713/157 |
| 6,892,307 | B1 | * | 5/2005  | Wood et al. ...................... 726/8 |
| 7,085,232 | B1 | * | 8/2006  | Raissinia et al. .............. 370/235 |
| 7,225,341 | B2 | * | 5/2007  | Yoshino et al. ............... 713/193 |
| 7,305,701 | B2 | * | 12/2007 | Brezak et al. ..................... 726/5 |
| 7,512,782 | B2 | * | 3/2009  | Kaler et al. .................... 713/155 |
| 7,685,206 | B1 | * | 3/2010  | Mathew et al. ............... 707/785 |

(Continued)

FOREIGN PATENT DOCUMENTS

JP  2004164299 A  6/2004
JP  2005071339 A  3/2005

(Continued)

OTHER PUBLICATIONS

A Browser-Based Kerberos Authentication Scheme by Gajek et al; Publisher: Springer-Verlag Berlin Heidelberg; Year: 2008.*

(Continued)

*Primary Examiner* — Madhuri Herzog
(74) *Attorney, Agent, or Firm* — Ryan, Mason & Lewis, LLP

(57) ABSTRACT

In a communication network wherein a first computing device represents a resource owner and a second computing device represents a resource requestor, the resource owner detects an occurrence of an event, wherein the event occurrence represents a request to access one or more resources of the resource owner stored in a resource residence. The resource owner sends an authorization token to the resource requestor in response to the event occurrence, the authorization token serving as a proof of authorization delegated by the resource owner to be presented by the resource requestor to the resource residence so as to permit the resource requestor to access the one or more requested resources stored in the resource residence.

31 Claims, 9 Drawing Sheets

(56) References Cited

U.S. PATENT DOCUMENTS

| | | | |
|---|---|---|---|
| 8,131,952 B2* | 3/2012 | Jang et al. | 711/156 |
| 2002/0038425 A1* | 3/2002 | Kanno | 713/185 |
| 2002/0147929 A1* | 10/2002 | Rose | 713/201 |
| 2003/0097655 A1* | 5/2003 | Novak | 725/31 |
| 2003/0188117 A1* | 10/2003 | Yoshino et al. | 711/164 |
| 2004/0019801 A1 | 1/2004 | Lindholm et al. | |
| 2005/0120211 A1 | 6/2005 | Yokoyama | |
| 2006/0080546 A1* | 4/2006 | Brannon et al. | 713/185 |
| 2008/0019527 A1* | 1/2008 | Youn et al. | 380/278 |

FOREIGN PATENT DOCUMENTS

| | | |
|---|---|---|
| JP | 2005157881 A | 6/2005 |
| JP | 2006221506 A | 8/2006 |
| JP | 2007233705 A | 9/2007 |
| WO | PCT/US2011/025641 | 7/2011 |

OTHER PUBLICATIONS

Enforcing Distributed Data Security via Web Services by Alfred C. Weaver; Publisher: IEEE; Year: 2004.*

E. Hammer-Lahav et al., "The OAuth Core 1.0 Protocol; draft-hammer-oauth-03," Network Working Group, Internet Engineering Task Force, (IETF), Internet-Draft, Sep. 2009, 35 pages, Geneva, Switzerland.

B. Vrancken et al., "Using OAuth for Recursive Delegation; draft-vrancken-oauth-redelegation-01," Internet Engineering Task Force (IETF), Internet-Draft, Feb. 2010, 11 pages, Geneva, Switzerland.

* cited by examiner

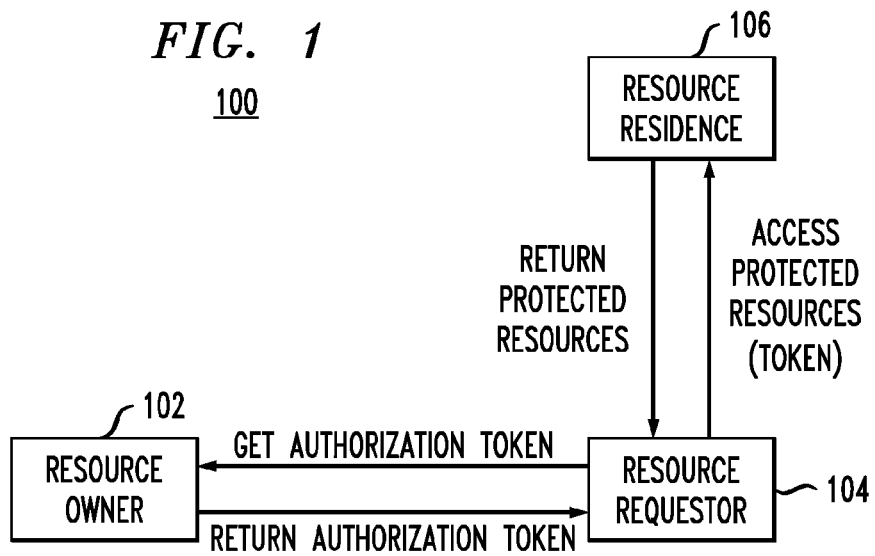

- 204 — UNIQUE TOKEN IDENTIFIER
- 206 — ISSUER: *RESOURCE OWNER*
- 208 — ISSUER'S CHAIN OF CERTIFICATES OR POINTERS TO CERTIFICATES
- 210 — SIGNATURE ALGORITHM
- 212 — REQUESTOR: *RESOURCE REQUESTOR*
- 214 — *METHOD OR STRENGTH OF THE METHOD FOR AUTHENTICATING THE REQUESTOR*
- 216 — RECIPIENT: *RESOURCE SERVER*
- 218 — LIST OF RESOURCES AND RIGHTS
- 220 — EXPIRATION TIME
- 222 — MAXIMUM NUMBER OF USE
- 224 — DEGREE OF TRANSFERABILITY

202
SIGNATURE (COMPUTED WITH THE ISSUER'S PRIVATE KEY OR A SHARED SECRET)

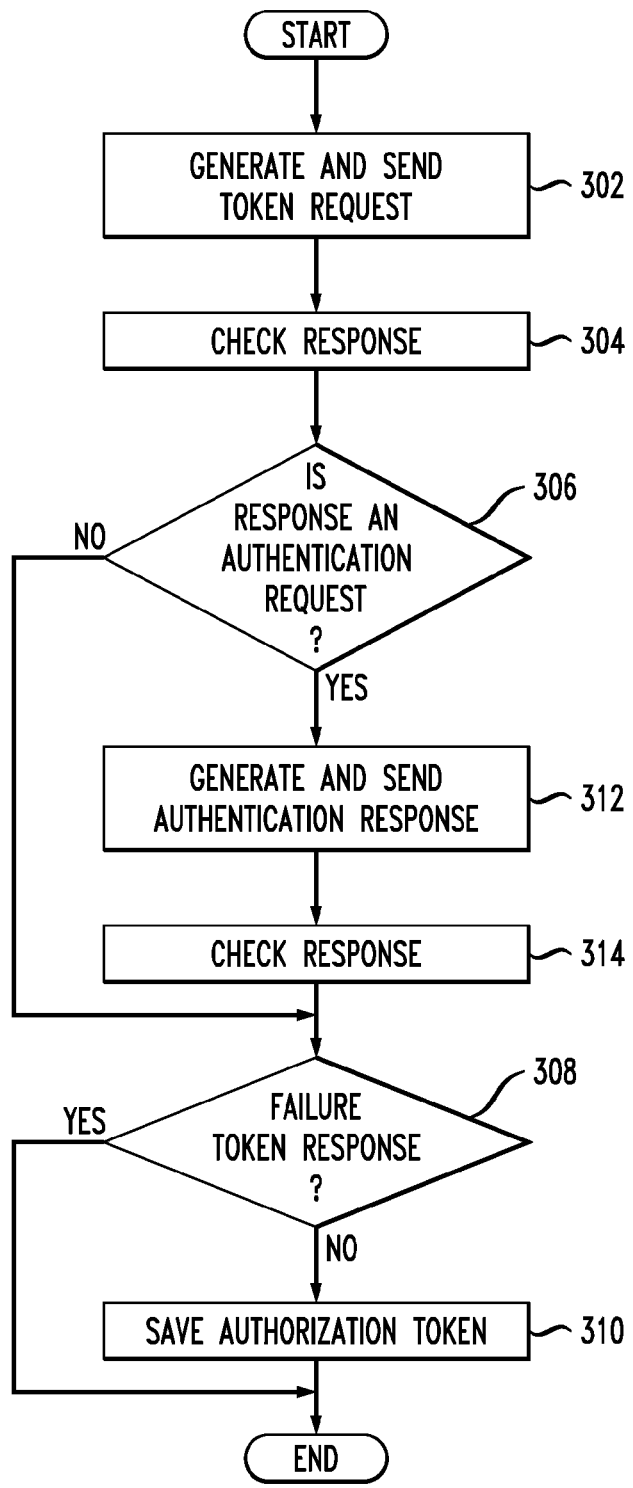

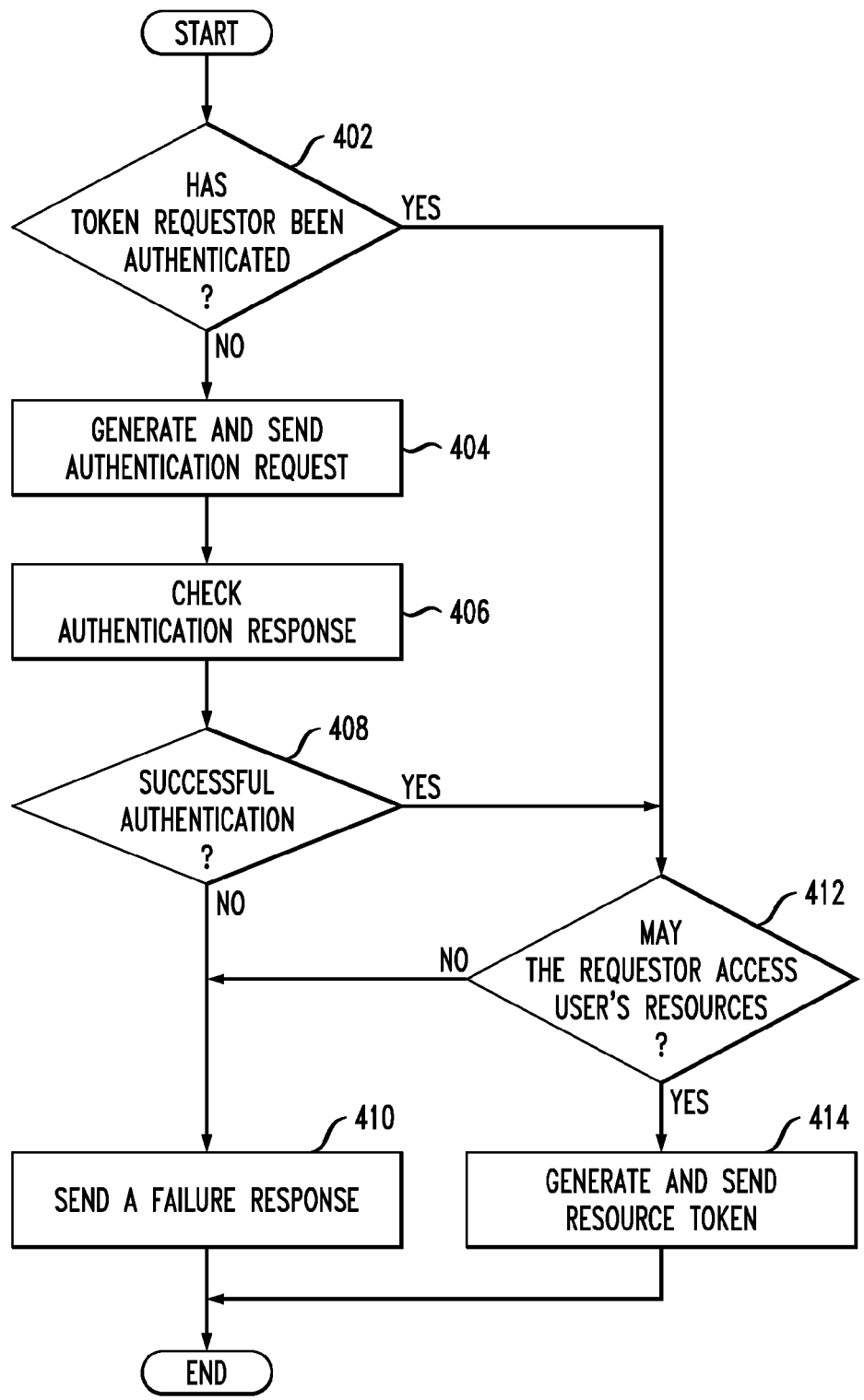

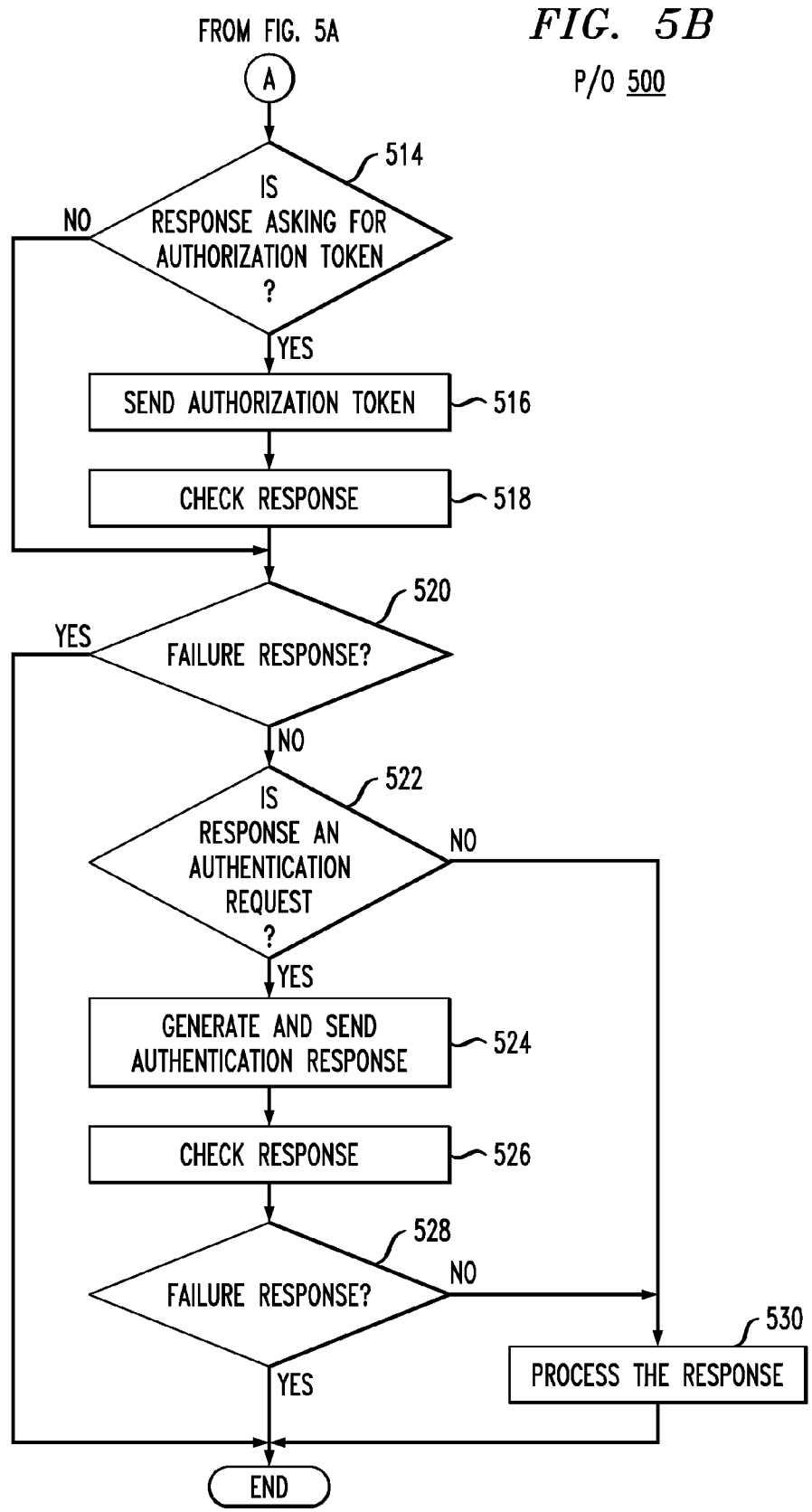

700

704 — • OLD TOKEN
706 — • OLD REQUESTOR'S CHAIN OF CERTIFICATES OR POINTERS TO CERTIFICATES
708 — • NEW REQUESTOR
710 — • LIST OF DOWNGRADED SCOPE FIELDS

702 — SIGNATURE (COMPUTED WITH THE OLD REQUESTOR'S PRIVATE KEY OR A SHARED SECRET)

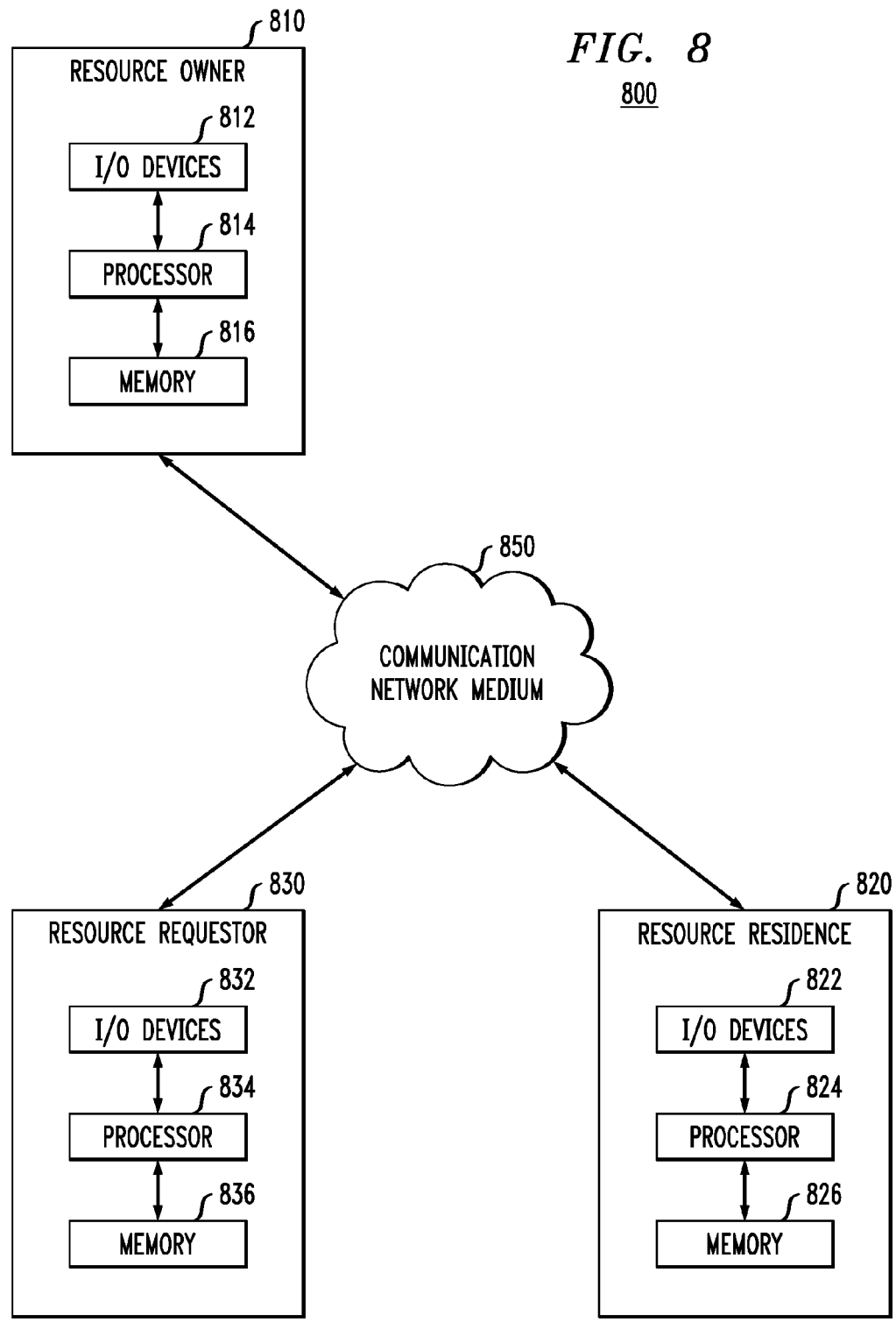

SECURE DYNAMIC AUTHORITY DELEGATION

FIELD OF THE INVENTION

The present invention relates generally to communication networks, and more particularly to techniques for use in communication networks for secure dynamic delegation of authority to enable applications that involve access to protected resources by entities other than the resource owner.

BACKGROUND

This section introduces aspects that may help facilitate a better understanding of the inventions. Accordingly, the statements of this section are to be read in this light and are not to be understood as admissions about what is prior art or what is not prior art.

Various facilities available via communication networks, such as the World Wide Web, permit users to create their own applications or web pages. One example is known as a "mashup," which is a web page or application that uses or combines data or functionality from two or many more sources to create a new service or application.

A problem arises, however, when the user is required to give his/her credentials (username and password) for one source to another source, thus exposing information between sources and giving one source full access to the other source. This may not be desirable to the user.

A protocol known as OAuth attempts to provide a solution to this problem. In general, the OAuth protocol (see http://oauth.net/) enables users to provide third-party access to their web resources without sharing their passwords. However, there are several limitations and weaknesses to this protocol. First, since the protocol is tied to the Hypertext Transfer Protocol (HTTP), it is not applicable to non-web applications. Second, since the protocol relies on the use of HTTP redirection, it is vulnerable to phishing attacks. The protocol also requires multiple round trips for obtaining delegated authorization, and it is not optimal for application performance. Lastly, since the protocol uses more than one type of delegation proof and a proofing scheme that involves repeated cryptographic signing, it is more complex than necessary.

As such, there is a need for an improved approach to authority delegation that overcomes these and other drawbacks.

SUMMARY

Embodiments of the invention provide general, effective, and secure methods for dynamic delegation of authority to enable applications (e.g., mashups and third-party applications) on communication networks (e.g., World Wide Web or in Next Generation networks) that involve access to protected resources by entities other than the resource owner.

In a first aspect, a method comprises the following steps. In a communication network wherein a first computing device represents a resource owner and a second computing device represents a resource requestor, the resource owner detects an occurrence of an event, wherein the event occurrence represents a request to access one or more resources of the resource owner stored in a resource residence. The resource owner sends an authorization token to the resource requestor in response to the event occurrence, the authorization token serving as a proof of authorization delegated by the resource owner to be presented by the resource requestor to the resource residence so as to permit the resource requestor to access the one or more requested resources stored in the resource residence.

In one or more embodiments, the event occurrence may be receipt of a resource request by the resource owner from the resource requestor (e.g., pull method). Alternatively, the event occurrence may be an occurrence of a triggering event associated with an application program (e.g., push method). The resource residence may reside in a third computing device or it may reside in the first computing device. The authorization token may have one or more of a verifiable structure, a limited lifetime, and specify a method for authenticating the resource requestor or a level of assurance for authenticating the resource requestor. The verifiable structure may comprise a digital signature of the resource owner. The authorization token may specify one or more actions that are permitted to be performed in accordance with the one or more requested resources. The resource requestor may obtain the authorization token from the resource owner in one round trip. The mechanism for obtaining a token may be bound to an existing application protocol. The presentation of the authorization token to gain access to the one or more requested resources may also be bound to an existing application protocol.

Further, the proof of authorization delegated by the resource owner may be transferred from the resource requestor to at least another resource requestor such that the other resource requestor can present another authorization token to the resource residence so as to permit the other resource requestor to access the one or more requested resources stored in the resource residence. The other authorization token obtained by the other resource requestor may specify an action permission scope that is a subset of an action permission scope specified in the authorization token obtained directly from the resource owner by the resource requestor. In one embodiment, the other authorization token obtained by the other resource requestor does not change the method for authenticating the resource requestor or a level of assurance for authenticating the resource requestor. Further, the other authorization token may be a modified form of the authorization token originally received and the previous resource requestor performs the modification prior to sending the modified form of the authorization token to the other resource requestor.

Still further, the resource owner may authenticate the resource requestor before sending the authorization token to the resource requestor.

In a second aspect, a method comprises the following steps. In a communication network wherein a first computing device represents a resource owner and a second computing device represents a resource requestor, and wherein the resource owner detects an occurrence of an event and the event occurrence represents a request to access one or more resources of the resource owner stored in a resource residence, the resource requestor receives an authorization token sent by the resource owner in response to the event occurrence, the authorization token serving as a proof of authorization delegated by the resource owner to be presented by the resource requestor to the resource residence so as to permit the resource requestor to access the one or more requested resources stored in the resource residence.

In one or more embodiments, the resource residence may authenticate the resource requestor prior to the resource requestor presenting the authorization token to the resource residence. The resource residence verifies the authorization token presented by the resource requestor prior to acting on the one or more requested resources. Further, the resource residence may authenticate the resource requestor after the resource requestor presents the authorization token to the resource residence. The resource requestor may also transfer the proof of authorization delegated by the resource owner to at least another resource requestor. Such transfer may comprise the resource requestor sending another authorization token to the other resource requestor such that the other resource requestor can present the other authorization token to the resource residence so as to permit the other resource requestor to access the one or more requested resources stored in the resource residence.

In a third aspect, a method comprises the following steps. In a communication network wherein a first computing device represents a resource owner and a second computing device represents a resource requestor, and wherein the resource owner detects an occurrence of an event and the event occurrence represents a request to access one or more resources of the resource owner stored in a resource residence, and wherein the resource requestor receives an authorization token sent by the resource owner in response to the event occurrence, the resource residence receives the authorization token, the authorization token serving as a proof of authorization delegated by the resource owner to the resource requestor to permit the resource requestor to access the one or more requested resources stored in the resource residence.

Advantageously, the dynamic authority delegation techniques of the invention are applicable to web and non-web applications. Said inventive techniques do not rely on the use of HTTP redirection, and do not require multiple round trips for obtaining delegated authorization. Further, said inventive techniques are less complex than existing authority delegation schemes.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating entities which participate in secure dynamic authority delegation, according to one embodiment of the invention.

FIG. 2 is a diagram of a basic structure of an authorization token, according to an embodiment of the invention.

FIG. 3 is a diagram of a method performed by a resource requestor for requesting an authorization token, according to an embodiment of the invention.

FIG. 4 is a diagram of a method performed by a resource owner in response to a request for an authorization token, according to an embodiment of the invention.

FIGS. 5A and 5B are diagrams of a method performed by a resource requestor for accessing protected resources, according to an embodiment of the invention.

FIG. 8 is a diagram of a hardware architecture of a communication network suitable for implementing secure dynamic authority delegation, according to an embodiment of the invention.

DETAILED DESCRIPTION OF THE INVENTION

Figure 5A:
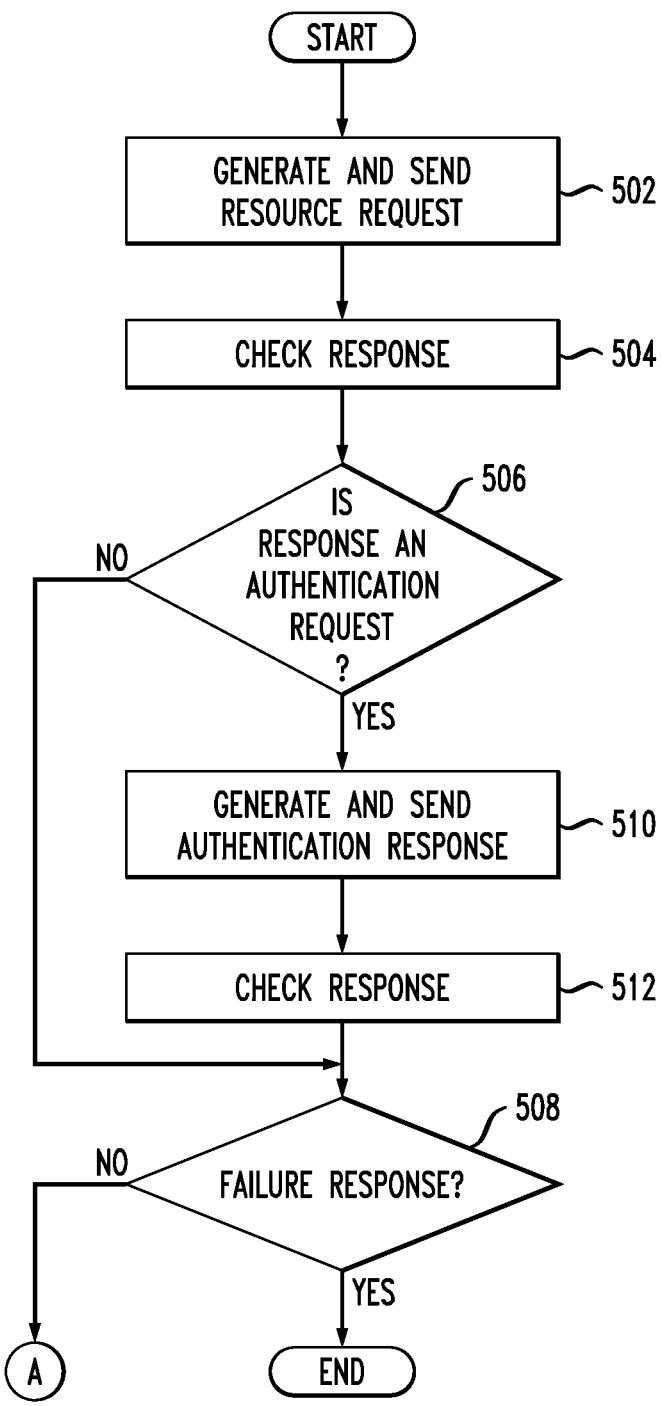

The present invention will be illustrated below in conjunction with exemplary communication networks and exemplary applications. It should be understood, however, that the invention is not limited to use with any particular type of communication network or application. The disclosed techniques are suitable for use with a wide variety of communication networks including web based and non-web based networks, and in numerous applications. In fact, the disclosed techniques may be implemented in any suitable communication network with any suitable applications wherein it would be desirable to provide dynamic delegation of authority to enable an application on a communication network that involves access to protected resources by entities other than the resource owners.

As used herein, "authority delegation" generally refers to one party, who has access to some item, giving permission to another party to access the item. By way of example, in the embodiments below, the resource owner gives the resource requestor permission to access some resource using an authorization token. The operation is considered "dynamic" in the sense that delegation is effected in real time as needed rather than through provisioning.

As used herein, a "token" generally refers to a data object or structure representing access control criteria and operations that is verifiable or can be authenticated.

As used herein, a "resource" generally refers to any item, data, information, or the like, that could be accessible over a communication network.

As used herein, an "application" generally refers to computer software designed to help a user or entity perform one or more specific tasks.

As will be explained herein, illustrative embodiments of the invention provide techniques whereby a resource requestor can dynamically obtain, directly from a resource owner, permission to access its resources in a resource residence. A "residence," as used herein, generally refers to a storage location accessible via a communication network. A resource requestor can access the protected resources in the resource residence by presenting a proof of authorization delegated by the resource owner. The proof (namely an authorization token) has a verifiable structure and a limited lifetime, and specifies, among other things, the method or the level of assurance for authenticating the resource requestor. The resource requestor can obtain an authorization token dynamically from the resource owner in one round trip through a mechanism that is request-response based and can be bound to an existing application protocol. For example, a resource token request/response can be carried over HTTP or the Session Initial Protocol (SIP) as part of the message header or body or both. The mechanism for presenting the resource token to gain access to the protected resources is request-response based and can be bound to an existing application protocol. For example, the token can be carried over HTTP or SIP as part of the message header or body.

FIG. 1 provides illustrates a system 100 in which entities participate in secure dynamic authority delegation according to one embodiment of the invention. As shown, the system involves three types of actors: resource owner 102, resource requestor 104, and resource residence 106. It is to be appreciated that the three actors can each be implemented as one or more computing devices, as will be further explained below.

The resource owner 102 can be embodied as a user agent (in the case of an end user) or an authorization server (in the case of a service provider or an organization). Similarly, the resource requestor 104 can be embodied as a user agent (in the case of an end user) or an application server (in the case of a service provider or an organization). In a use case where "Alice" (operating computing device A) asks a photo-printing service provider to print her pictures for her Moscow trip stored on a server, the resource owner 102 (Alice) would be represented by a user agent (e.g., a web browser program executing on computing device A), and the resource requestor 104 (the photo-printing service provider) would be represented by an application server. In another use case where "Bob" (operating computing device B) is a subscriber of an online movie service, the resource owner 102 (the online movie service provider) would be represented by an authorization server, and the resource requestor 104 (Bob) would be represented by a user agent (e.g., a web browser program executing on computing device B).

To gain access to certain protected resources in the resource residence 106, the resource requestor 104 needs to obtain directly from the resource owner 102 an authorization token that has a basic structure 200 as illustratively shown in FIG. 2 (to be further discussed below). To that end, two methods are possible: pull and push. In the pull method, the resource requestor 104 and the resource owner 102 exchange a request and response. The token request shall identify, at least, the requestor, and the target resources and associated actions. FIGS. 3 and 4, explained below, depict the pull method from the perspectives of the resource requestor 104 and the resource owner 102, respectively. In the push method, the resource owner 102 can issue the resource requestor 104 an authorization token as a result of an application trigger rather than an explicit request from the resource requestor.

FIG. 3 shows the pull method 300 on the resource requestor (e.g., 104 in FIG. 1) side for requesting a basic authorization token. In step 302, the resource requestor generates and sends an authorization token request to the request owner. In step 304, the resource requestor checks a first response it receives from the resource owner and determines, in step 306, whether the first response includes an authentication request (whereby the resource owner is requesting that the requestor be authenticated before the owner sends the authorization token to the requestor) or whether the first response includes the authorization token.

If the first response from the resource owner is not an authentication request but rather includes the authorization token, and thus step 308 (i.e., check for receipt of a failure token response described below) yields a negative, the requestor saves the authorization token (for subsequent transmission to the resource residence) in step 310.

If, however, the first response from the resource owner is an authentication request, then in step 312, the resource requestor generates and sends an authentication response to the resource owner. In step 314, the resource requestor then checks a second response it receives from the resource owner and determines whether the second response includes the authorization token (thus assuming authentication was successful). If so, then step 308 (failure token response) yields a negative, and the requestor saves the authorization token (for subsequent transmission to the resource residence) in step 310. However, if authentication failed, then the second response received from the resource owner is a failure token response, i.e., meaning that the resource owner will not issue an authorization token to the requestor. It is to be understood that the technique used for authenticating the requestor can comprise any conventional authentication technique.

FIG. 4 shows the pull method 400 on the resource owner (e.g., 102 in FIG. 1) side for handling the token request. In step 402, the resource owner checks whether or not the resource requestor (from which a token request has been received) has been authenticated. If not, in step 404, the resource owner generates an authentication request and sends it to the resource requestor. In step 406, the resource owner checks the authentication response received from the resource requestor. A check is made in step 408 to determine whether authentication was successful. If no, then the resource owner sends, in step 410, a failure token response to the requestor (i.e., no authorization token is sent to the requestor). However, if authentication was successful, the owner decides, in step 412, whether the requestor should be given access to the owner's resource(s), and if so, generates an authorization token and sends it to the requestor in step 414. If, however, access is denied, then the failure token response is sent in step 410.

Armed with the authorization token, the resource requestor 104 can then request access to the protected resources in the resource residence 106. Upon receiving the resource request (see FIG. 1), the resource residence 106 takes the following actions:

1—Verify that the digital signature associated with the request is valid based on the digital signature method specified in the token;

2—Verify that the token has not expired in terms of time and the maximum number of use;

3—Verify that the requested resources and actions to be performed are part of the list of resources and associated rights specified in the token;

4—Verify that the name of the resource requestor matches the requestor name in the token; and 5—Authenticate the resource requestor using the method or a method of the strength level specified in the token.

FIGS. 5A and 5B show a method 500 on the resource requestor (e.g., 104 in FIG. 1) side for access to protected resources (without necessarily including an authorization token in the initial request) held by a resource residence (e.g., 106 in FIG. 1).

In step 502, the resource requestor generates and sends a resource request to the request residence. In step 504, the resource requestor checks a first response it receives from the resource residence and determines, in step 506, whether the first response includes an authentication request (whereby the resource residence is requesting that the requestor be authenticated before the residence permits access to the resource by the requestor) or whether the first response is asking for the authorization token.

If the first response from the resource residence is not an authentication request but rather is asking for the authorization token (514 described below), and thus step 508 (i.e., check for receipt of a failure response described below) yields a negative, the requestor sends the authorization token (516 described below).

If, however, the first response from the resource residence is an authentication request, then in step 510, the resource requestor generates and sends an authentication response to the resource residence. In step 512, the resource requestor then checks a second response it receives from the resource residence and determines whether the second response is a failure response (508) or a request for the authorization token (514) thus assuming authentication was successful. If the latter, the requestor sends the authorization token (that it received from the resource owner in accordance with the protocol described above in the context of FIGS. 3 and 4) in step 516.

In step 518, the resource requestor then checks a third response it receives from the resource residence and determines whether the third response is another authentication request, i.e., a subsequent authentication request by the residence to ensure that the requestor be authenticated with a method prescribed in the token. That is, for added security, the resource residence may need to re-authenticate the requestor each time a token is received. If so, steps 524, 526 and 528 are performed, which are similar to steps 510, 512 and 508 that are described above. In step 530, the requestor processes the response, which typically contains the requested resource(s).

Figure 6A:
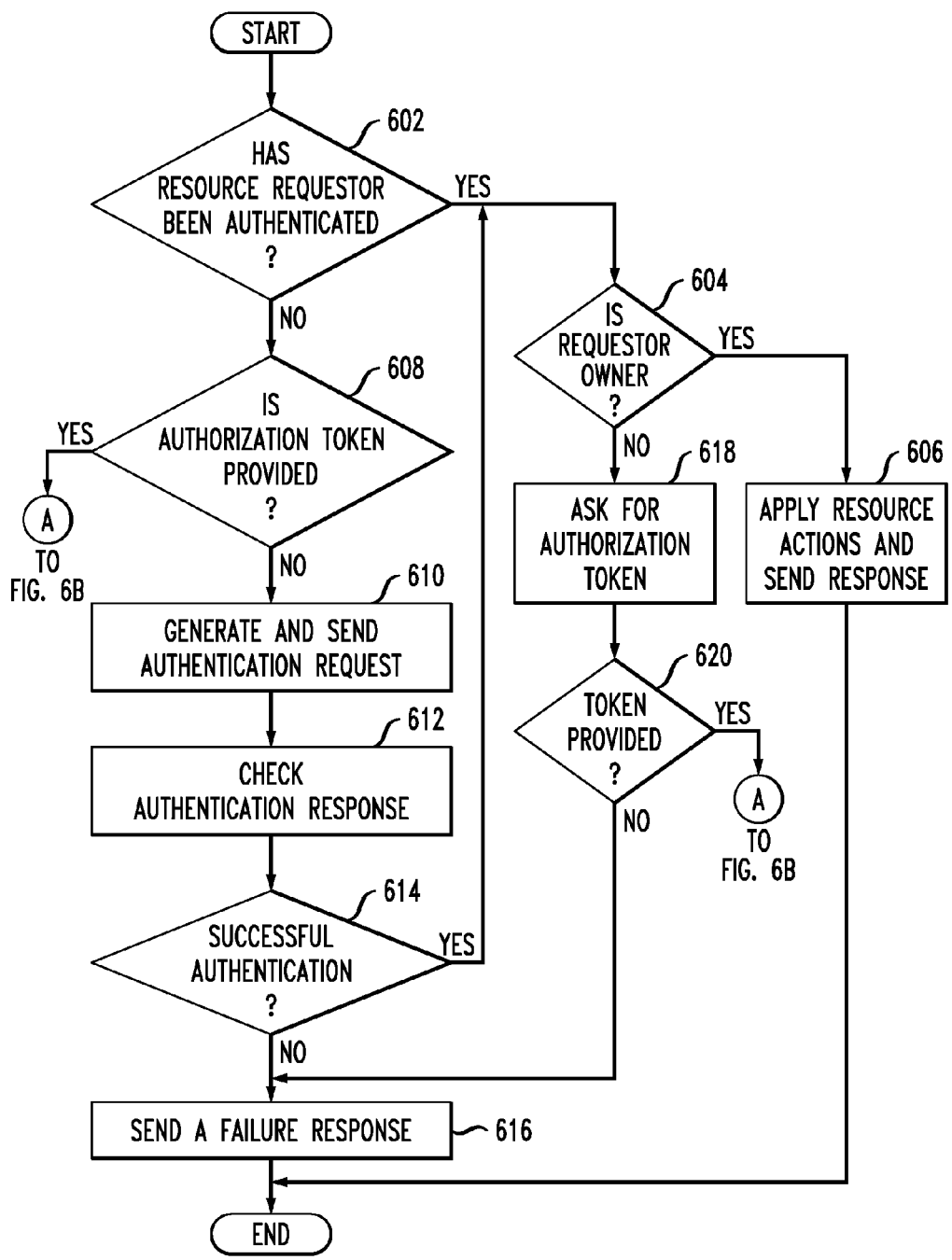
FIGS. 6A and 6B are diagrams of a method performed by a resource residence in response to a request to access protected resources, according to an embodiment of the invention.
Figure 6B:
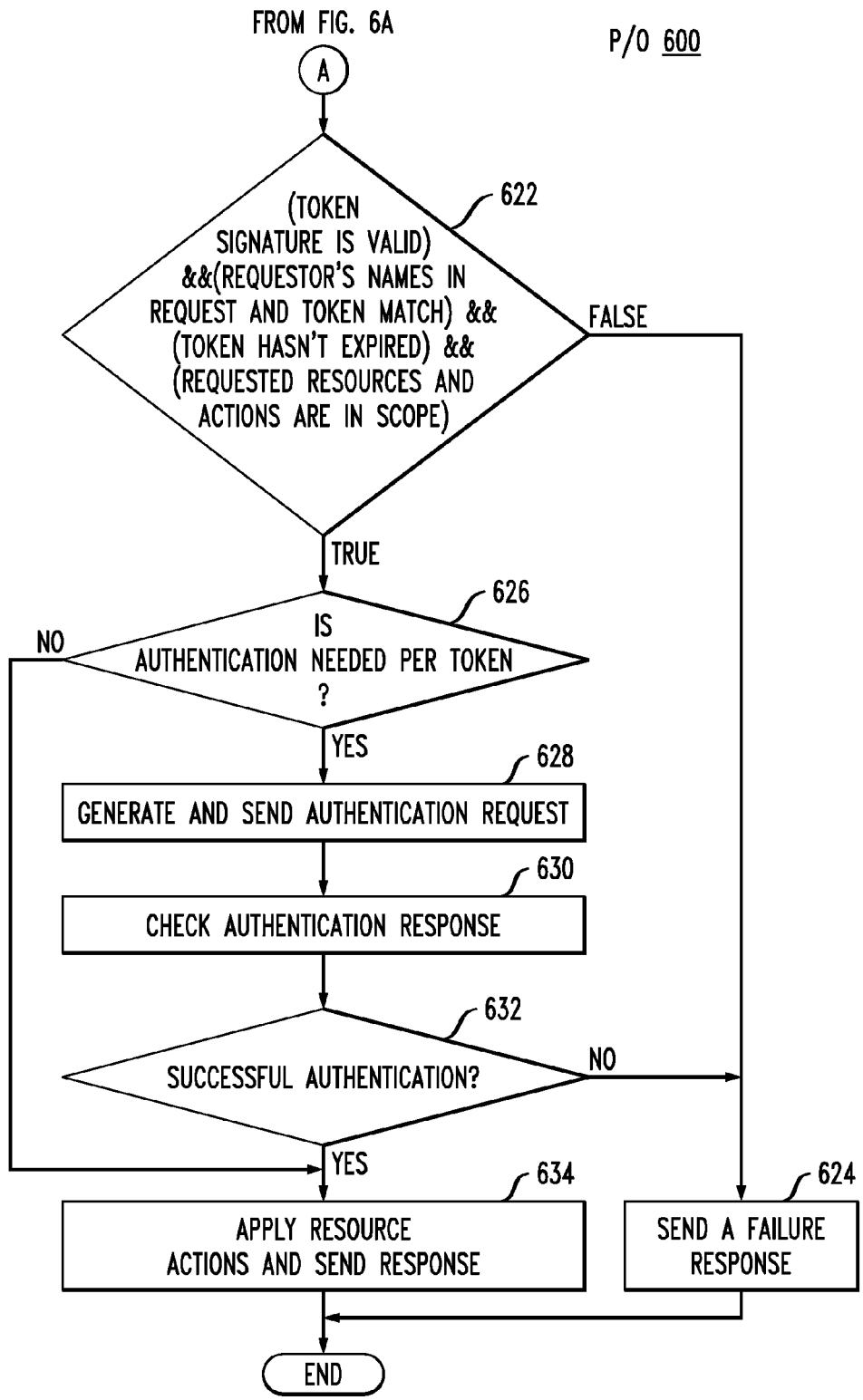

FIGS. 6A and 6B show a method 600 on the resource residence (e.g., 106 in FIG. 1) side for handling a resource request from a resource requestor (e.g., 104 in FIG. 1). In step 602, the resource residence checks whether the resource requestor has been authenticated. If yes, then in step 604, the resource residence confirms whether the requestor is the resource owner (in which case, the requestor would not need an authorization token). If yes, then in step 606, the residence applies the appropriate resource actions and sends a response (e.g., providing access to requested resource(s)).

However, going back to step 602, if the requestor has not been authenticated and an authorization token has not yet been provided by the requestor (step 608), an authentication process is performed in steps 610 (generate and send request to requestor), 612 (check authentication response), and 614 (confirm authentication success). If not successful, then a failure response is sent to requestor in step 616. However, if authentication was successful, then step 604 is performed (check whether requestor is owner) and if affirmative, then step 606 (apply resource actions and send response) is performed. However, after successful authentication (in step 614) and verification that the requestor is not the resource owner (in step 604), the residence asks the requestor for the authorization token in step 618, and checks whether it was provided by the requestor in step 620. If not, a failure response is sent in step 616.

Once the token has been received, the resource residence verifies the token in step 622. For example, a verification is performed to determine whether a token signature is valid, the requestor's names in the request and the token match, the token has not expired, the requested resources and actions are within scope (i.e., what is permitted for the requestor and/or resource being requested). It is to be understood that fewer or more verifications can be made to the token and its contents, depending on the structure of the token. If one or more aspects of the token can not be verified, a failure response is sent to the requestor, in step 624, and thus the resource is not made available to the requestor. However, if all aspects of the received token are verified, another authentication process may be requested by the residence according to the authentication requirement (in terms of the method or assurance level) specified in the token. This is done via steps 626, 628, 630 and 632, which are similar to steps 610, 612, and 614. Assuming the second authentication is successful, the resource actions are applied and a response sent (i.e., access to resource permitted) in step 634. If not, then a failure response is sent in step 624.

Returning again to FIG. 2, the basic structure of the authorization token is composed of a list of fields (in terms of name-value pairs) and the issuer's signature 202 computed over the fields using a signature algorithm 210 specified (e.g., RSA-SHA1 and HMAC-SHA256) based on the issuer's private key or a shared secret. The unique token identifier 204 can be constructed by concatenating the issuer's name 206 and a timestamp. The issuer's chain of certificates or pointers to the certificates 208 are specified in the token. Note that this field need only be included to improve the overall performance when the algorithm used for computing the issuer's signature is private-key based. Field 212 specifies the name (identity) of the resource requestor. Field 214 specifies the method or strength of the method for authenticating the requestor. Field 216 specifies the name (identity) of the recipient, i.e., the device or server acting as the resource residence.

The combined fields of the list of resources and rights 218, the expiration time 220, and maximum number of use 222 set the overall delegation scope. The degree of transferability 224 indicates the degree that a token issued by the resource owner can be forwarded down to a series of token requestors starting from the original requestor. It can assume a value of a non-negative integer. A token of zero-th degree of transferability can not be forwarded. A token of N-th degree of transferability can be transferred by an original token requestor to a second token requestor to a third requestor and so on to the N-th requestor at most.

Figure 7:
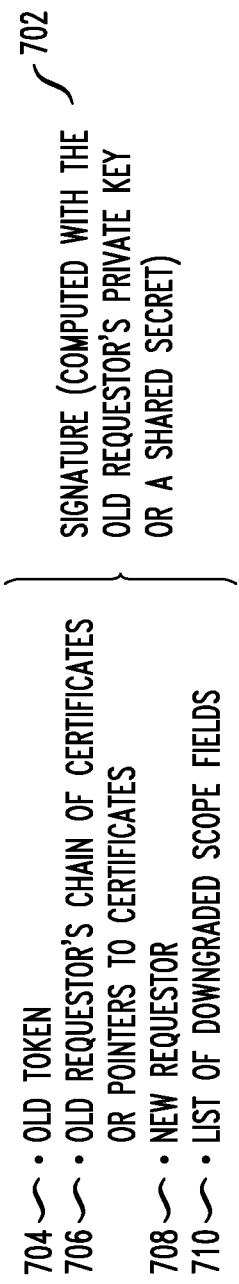
FIG. 7 is a diagram of a structure of another authorization token, according to an embodiment of the invention

After obtaining a transferable token, the requestor can issue a new token based on the old one to a new requestor. As shown in FIG. 7, the new token 700 specifies the identity of a new requestor 708 (which will be authenticated by the same method as before) and possibly a downgraded delegation scope 710. In one embodiment, the new token 700 also contains the old token 704 (i.e., token structure shown in FIG. 2), as well as the previous requestor's (now the issuer) chain of certificates or pointers to the certificates 706. The issuer's signature 702 is computed over the fields using a signature algorithm (which may be the same as the signature algorithm specified in the old token) based on the issuer's private key or a shared secret.

When verifying a forwarded token, the resource residence needs to check, in addition, that:

1—The degree of transferability is greater than the number of new requestors present;

2—All signatures are valid; and

3—The scopes are not broadened as the token is forwarded along the way.

A use case of transferable tokens is as follows: Alice publishes certain content on a content server and makes the associated content manager her proxy for handling access to her content by others. Note that to support tokens that are transferable or of limited number of use, the resource residence needs to keep state.

Lastly, FIG. 8 illustrates a generalized hardware architecture of a communication network 800 suitable for implementing secure dynamic authority delegation, according to the above-described principles of the invention.

As shown, a computing device for resource owner 810 (e.g., 102 in FIG. 1), a computing device for resource residence 820 (e.g., 106 in FIG. 1), and a computing device for resource requestor 830 (e.g., 104 in FIG. 1) are operatively coupled via communication network medium 850. The network medium may be any network medium across which the computing devices desire to communicate. By way of example, the network medium can carry IP packets end to end and may involve UMTS (Universal Mobile Telecommunications System) or WiFi or DSL (Digital Subscriber Line) in the access network, Ethernet in the metro network, and MPLS (Multiprotocol Label Switching) in the backbone. However, the invention is not limited to a particular type of network medium. Typically, each computing device may function as a client machine or a server machine, depending on the authority delegation scenario being performed. It is also to be understood that while the resource residence is shown as a separate computing device, the residence can be part of the same computing devices as the owner or the requestor. Also, while the resource owner, requestor and residence are each shown in FIG. 8 as being implemented via one computing device, it is to be understood that each may be implemented via more than one such computing device.

As would be readily apparent to one of ordinary skill in the art, the computing devices may be implemented as programmed computers operating under control of computer program code. The computer program code would be stored in a computer (or processor or machine) readable storage medium (e.g., a memory) and the code would be executed by a processor of the computer. Given this disclosure of the invention, one skilled in the art could readily produce appropriate computer program code in order to implement the protocols described herein.

Nonetheless, FIG. 8 generally illustrates an exemplary architecture for each device communicating over the network medium. As shown, resource owner 810 comprises I/O devices 812, processor 814, and memory 816. Resource residence 820 comprises I/O devices 822, processor 824, and memory 826. Resource requestor 830 comprises I/O devices 832, processor 834, and memory 836.

It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU. That is, each computing device (810, 820, and 830) shown in FIG. 8 may be individually programmed to perform their respective steps of the protocols depicted in FIGS. 1 and 7.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
in a communication network wherein a first computing device represents a resource owner and a second computing device represents a resource requestor, the resource owner detecting an occurrence of an event, wherein the event occurrence represents a request to access one or more resources of the resource owner stored in a resource residence; and
the resource owner sending an authorization token to the resource requestor in response to the event occurrence, the authorization token serving as a proof of authorization delegated by the resource owner to be presented by the resource requestor to the resource residence so as to permit the resource requestor to access the one or more requested resources stored in the resource residence;
wherein the authorization token comprises a verifiable structure comprising:
one or more fields, the one or more fields comprising at least one of: a method to be used by the resource residence for authenticating the resource requestor; and a strength of the method to be used by the resource residence for authenticating the resource requestor; and
a signature computed over the one or more fields, the signature being computed utilizing a private key of the resource owner.

2. The method of claim 1, wherein the event occurrence is receipt of a resource request by the resource owner from the resource requestor such that the resource requestor and the resource owner exchange a request and a response via a pull communication method.

3. The method of claim 1, wherein the event occurrence is an occurrence of a triggering event associated with an application program rather than an explicit request from the resource requestor such that a communication method between the resource requestor and the resource owner is a push communication method.

4. The method of claim 1, wherein the resource residence resides in a third computing device.

5. The method of claim 1, wherein obtaining the authorization token and presentation of the authorization token to gain access to the one or more requested resources is bound to an existing application protocol.

6. The method of claim 1, wherein the authorization token has a limited lifetime, the limited lifetime comprising a length of time and a maximum number of uses of the authorization token.

7. The method of claim 1, wherein the authorization token specifies a method for authenticating the resource requestor or a level of assurance for authenticating the resource requestor.

8. The method of claim 1, wherein the authorization token specifies one or more actions that are permitted to be performed in accordance with the one or more requested resources.

9. The method of claim 1, wherein the resource requestor obtains the authorization token from the resource owner in one round trip.

10. The method of claim 1, wherein the proof of authorization delegated by the resource owner is transferable from the resource requestor to at least another resource requestor without further communicating with the resource owner such that another authorization token is presentable by the at least another resource requestor to the resource residence so as to permit the at least another resource requestor to access the one or more requested resources stored in the resource residence.

11. The method of claim 10, wherein the other authorization token obtained by the at least another resource requestor specifies an action permission scope that is a subset of an action permission scope specified in the authorization token obtained directly from the resource owner by the resource requestor.

12. The method of claim 10, wherein the other authorization token obtained by the other resource requestor does not change a method for authenticating the resource requestor or a level of assurance for authenticating the resource requestor originally specified in the authorization token.

13. The method of claim 10, wherein the other authorization token obtained by the at least another resource requestor comprises a signature of a previous resource requestor.

14. The method of claim 10, wherein the other authorization token is a modified form of the authorization token originally received and wherein the previous resource requestor performs the modification prior to sending the modified form of the authorization token to the at least another resource requestor.

15. The method of claim 1, further comprising the resource owner authenticating the resource requestor before sending the authorization token to the resource requestor.

16. An article of manufacture comprising a non-transitory processor-readable storage medium storing one or more software programs which when executed by a processor associated with the resource owner perform at least the steps of the method of claim 1.

17. A method, comprising:
in a communication network wherein a first computing device represents a resource owner and a second computing device represents a resource requestor, and wherein the resource owner having detected an occurrence of an event and the event occurrence represents a request to access one or more resources of the resource owner stored in a resource residence; and
the resource requestor receiving an authorization token sent by the resource owner in response to the event occurrence, the authorization token serving as a proof of authorization delegated by the resource owner to be presented by the resource requestor to the resource residence so as to permit the resource requestor to access the one or more requested resources stored in the resource residence;
wherein the authorization token comprises a verifiable structure comprising:
one or more fields, the one or more fields comprising at least one of: a method to be used by the resource residence for authenticating the resource requestor; and a strength of the method to be used by the resource residence for authenticating the resource requestor; and
a signature computed over the one or more fields, the signature being computed utilizing a private key of the resource owner.

18. The method of claim 17, further comprising the resource residence authenticating the resource requestor prior to the resource requestor presenting the authorization token to the resource residence.

19. The method of claim 17, further comprising the resource residence verifying the authorization token presented by the resource requestor prior to acting on the one or more requested resources.

20. The method of claim 17, further comprising the resource residence authenticating the resource requestor after the resource requestor presents the authorization token to the resource residence.

21. The method of claim 17, further comprising the resource requestor transferring the proof of authorization delegated by the resource owner to at least another resource requestor.

22. The method of claim 21, wherein the transferring step further comprises the resource requestor sending another authorization token to the at least another resource requestor without further communicating with the resource owner such that the other authentication token is presentable by the at least another resource requestor to the resource residence so as to permit the at least another resource requestor to access the one or more requested resources stored in the resource residence.

23. An article of manufacture comprising a non-transitory processor-readable storage medium storing one or more software programs which when executed by a processor associated with the resource requestor perform one or more steps of the method of claim 17.

24. A method, comprising:
in a communication network wherein a first computing device represents a resource owner and a second computing device represents a resource requestor, and wherein the resource owner having detected an occurrence of an event and the event occurrence represents a request to access one or more resources of the resource owner stored in a resource residence, and wherein the resource requestor having received an authorization token sent by the resource owner in response to the event occurrence; and
the resource residence receiving the authorization token, the authorization token serving as a proof of authorization delegated by the resource owner for presentation by the resource requestor to the resource residence so as to permit the resource requestor to access the one or more requested resources stored in the resource residence;
wherein the authorization token comprises a verifiable structure comprising:
one or more fields, the one or more fields comprising at least one of: a method to be used by the resource residence for authenticating the resource requestor; and a strength of the method to be used by the resource residence for authenticating the resource requestor; and
a signature computed over the one or more fields, the signature being computed utilizing a private key of the resource owner.

25. An article of manufacture comprising a non-transitory processor-readable storage medium storing one or more software programs which when executed by a processor associated with the resource residence perform one or more steps of the method of claim 24.

26. An apparatus, comprising:
a computing device in a communication network representing a resource owner, wherein the communication network also includes a resource requestor and a resource residence, the computing device comprising a memory and a processor coupled to the memory and configured to: detect an occurrence of an event, wherein the event occurrence represents a request to access one or more resources of the resource owner stored in the resource residence; and send an authorization token to the resource requestor in response to the event occurrence, the authorization token serving as a proof of authorization delegated by the resource owner to be presented by the resource requestor to the resource residence so as to permit the resource requestor to access the one or more requested resources stored in the resource residence;
wherein the authorization token comprises a verifiable structure comprising:
one or more fields, the one or more fields comprising at least one of: a method to be used by the resource residence for authenticating the resource requestor; and a strength of the method to be used by the resource residence for authenticating the resource requestor; and
a signature computed over the one or more fields, the signature being computed utilizing a private key of the resource owner.

27. An apparatus, comprising:
a computing device in a communication network representing a resource requestor, wherein the communication network also includes a resource owner and a resource residence wherein the resource owner having detected an occurrence of an event and the event occurrence represents a request to access one or more resources of the resource owner stored in the resource residence, the computing device comprising a memory and a processor coupled to the memory and configured to receive an authorization token sent by the resource owner in response to the event occurrence, the authorization token serving as a proof of authorization delegated by the resource owner to be presented by the resource requestor to the resource residence so as to permit the resource requestor to access the one or more requested resources stored in the resource residence;

wherein the authorization token comprises a verifiable structure comprising:

one or more fields, the one or more fields comprising at least one of: a method to be used by the resource residence for authenticating the resource requestor; and a strength of the method to be used by the resource residence for authenticating the resource requestor; and a signature computed over the one or more fields, the signature being computed utilizing a private key of the resource owner.

28. An apparatus, comprising:

a computing device in a communication network representing a resource residence, wherein the communication network also includes a resource owner and a resource requestor wherein the resource owner having detected an occurrence of an event and the event occurrence represents a request to access one or more resources of the resource owner stored in the resource residence, and wherein the resource requestor having received an authorization token sent by the resource owner in response to the event occurrence, the computing device comprising a memory and a processor coupled to the memory and configured to receive the authorization token, the authorization token serving as a proof of authorization delegated by the resource owner for presentation by the resource requestor to the resource residence so as to permit the resource requestor to access the one or more requested resources stored in the resource residence;

wherein the authorization token comprises a verifiable structure comprising:

one or more fields, the one or more fields comprising at least one of a method to be used by the resource residence for authenticating the resource requestor; and a strength of the method to be used by the resource residence for authenticating the resource requestor; and a signature computed over the one or more fields, the signature being computed utilizing a private key of the resource owner.

29. The method of claim 1, wherein the one or more fields comprise the method to be used by the resource residence for authenticating the resource requestor and the strength of the method to be used by the resource residence of authentication the resource requestor.

30. The method of claim 29, wherein the one or more fields further comprise:

a list of resource rights;

an expiration time;

a maximum number of uses; and a degree of transferability, the degree of transferability indicating a number of resource requestors to which the proof of authorization is permitted to be transferred.

31. The method of claim 30, wherein the degree of transferability indicates a length of a series of resource requesters along which the proof of authorization is permitted to be transferred.

* * * * *